Aug. 31, 1965  D. L. WOOD  3,203,728
MOUNT FOR TRACTOR CANOPY
Filed Oct. 4, 1962  2 Sheets-Sheet 1

Donald L. Wood
INVENTOR.

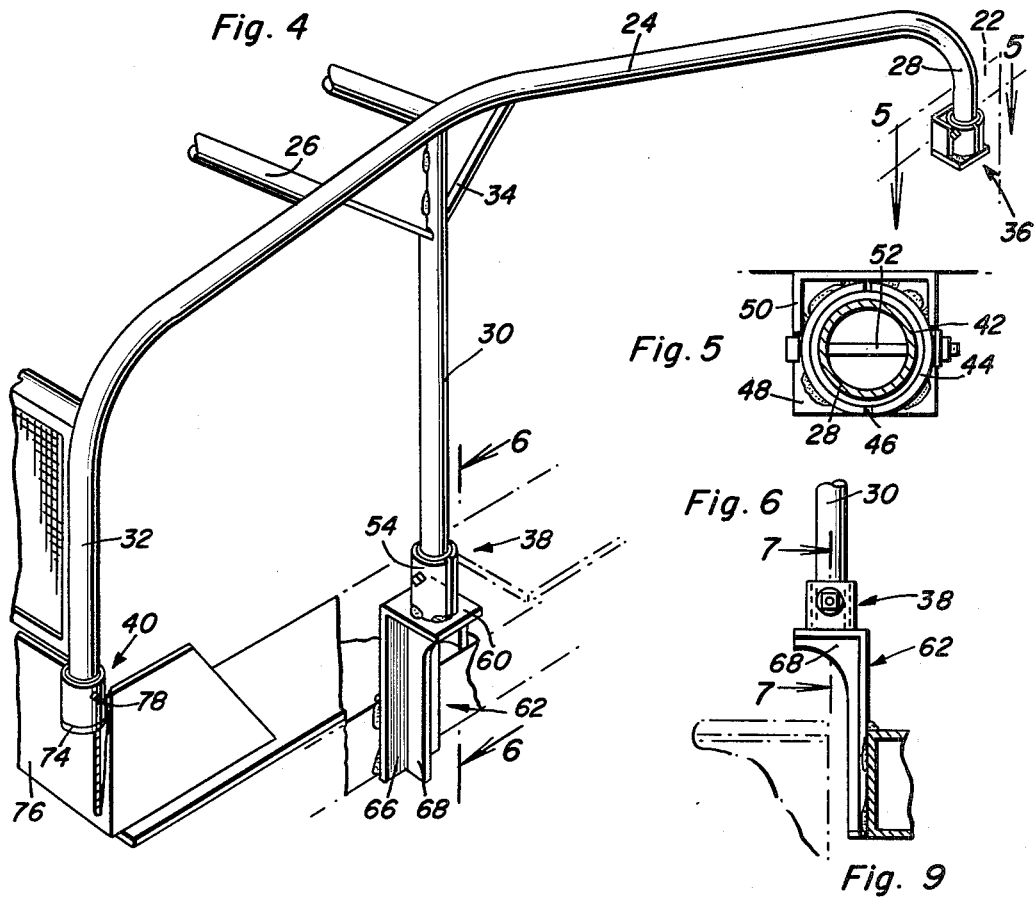

United States Patent Office 3,203,728
Patented Aug. 31, 1965

3,203,728
MOUNT FOR TRACTOR CANOPY
Donald L. Wood, Medford, Oreg., assignor to Concrete-Steel Corporation, Medford, Oreg., a corporation of Oregon
Filed Oct. 4, 1962, Ser. No. 228,421
1 Claim. (Cl. 296—102)

The present invention generally relates to tractors, and more particularly to canopies therefor and novel means for mounting such canopies.

One of the major difficulties encountered in providing protective canopies on tractors resides in the heretofore inability to compensate for the vibrations set up during the normal operation of the tractor, these vibrations producing undesirable rattles or noises as well as structural failures of the various canopy members or the joints therebetween.

Accordingly, one of the primary objects of the present invention resides in the provision of a mounting means for tractor canopies wherein the noise is dampened and the vibration is substantially eliminated.

Likewise, it is an object of the present invention to provide a mounting means which enables the mounting of the canopy with little or no difficulty.

Also, an object of the present invention resides in the provision of a simply constructed mounting means capable of effectively mounting the canopy on the tractor while allowing for a slight movement of the canopy relative to the tractor thus eliminating a major cause of structural failure in such canopies.

In conjunction with the above object, it is also an object of the invention to enable this slight movement or flexing to occur in all directions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a partial perspective view of the canopy and the mounting means therefor;

FIGURE 5 is an enlarged cross-sectional view taken substantially on a plane passing along line 5—5 in FIGURE 4;

FIGURE 6 is a cross-sectional view taken substantially on a plane passing along line 6—6 in FIGURE 4;

FIGURE 7 is an enlarged cross-sectional view taken substantially on a plane passing along line 7—7 in FIGURE 6;

FIGURE 8 is a cross-sectional view taken substantially on a plane passing along line 8—8 in FIGURE 7;

FIGURE 9 is an enlarged perspective view of the resilient rubber boot forming a part of the mounting means.

Figure 1:
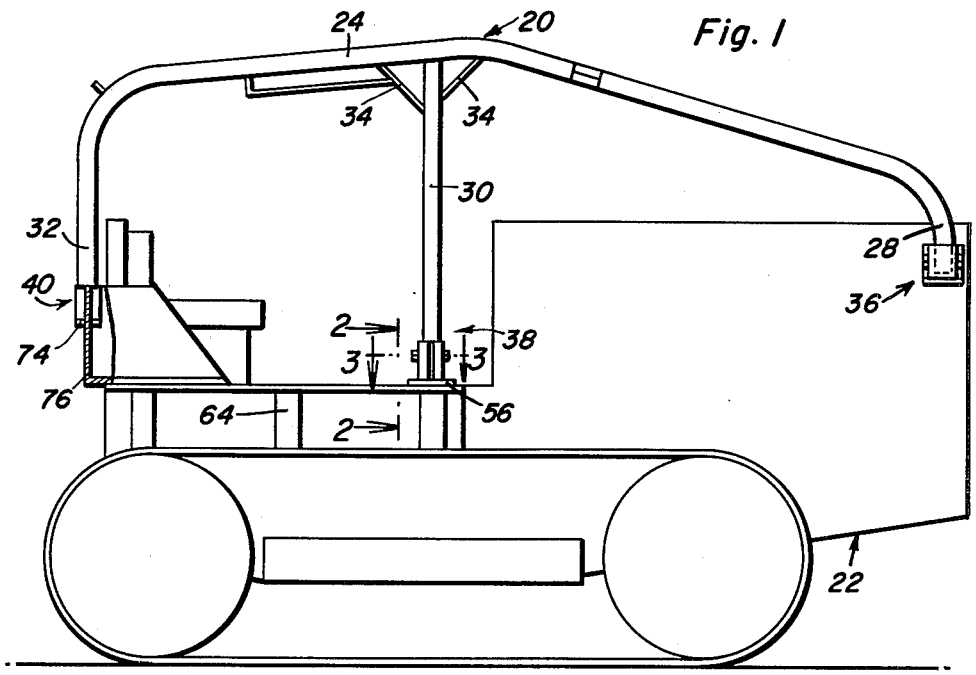
FIGURE 1 is a side elevational view of a tractor having the canopy mounted thereon.

Referring now more particularly to the drawings, reference numeral 20 generally designates a canopy of the type normally mounted on a tractor 22. The canopy 20 consists basically of two longitudinally extending support beams 24 laterally spaced from each other and rigidly interconnected by crossbeams 26. Three supporting posts 28, 30 and 32 are provided for each support beam 24 with the posts depending substantially vertically therefrom at the forward end, rearward end and an intermediate point. As will be appreciated from the drawings, the forward and rearward posts 28 and 32 are integrally formed with the support beams 24, the forward supporting post 28 being substantially shorter than the rearward post 32 both because of the forward and downward inclination of the forward end of the support beams 24 and the generally higher location of the mounting means for this post. The intermediate post 30, while not integrally formed with the support beam 24, is rigidly affixed thereto in any suitable manner such as by welding with various triangular haunch braces 34 being provided.

As stated in the objects supra, the present invention is primarily directed toward providing a novel mounting for the canopy 20 which is capable of compensating for the various vibrations set up as a result of the operation of the tractor. This is accomplished by providing sockets 36, 38 and 40 rigidly affixed to the tractor 22 at spaced points corresponding to the lower ends of the posts 28, 30 and 32. In order to provide the dampening effect, a resilient cushioning boot 42 having an open upper end and a closed bottom is provided within the sockets 36, 38 and 40, the boot 42 being of a size so as to closely conform to the interior of the sockets.

The socket 36 for mounting the forward support post 28 consists of two semi-circular sections 44 having the vertical edges thereof spaced slightly from each other so as to provide a space 46, the significance of which shall be gone into presently. The lower ends of these half sections 44 are rigidly welded to a flat base 48 which in turn is fixed to a channel bracket 50 mounted directly on the tractor 22. The boot 42 is positioned between the two half sections 44 and the lower end of the post 28 is subsequently inserted therein with a suitable bolt 52 extending through diametrically opposed aligned apertures in the sections 44, boot 42 and post 28 so as to effectively retain the lower end of the post 28 within the socket 36. Further, it will be appreciated that the half sections 44, being secured solely at the lower end thereof, can be flexed inwardly a slight degree by a tightening of the bolt means 52 thereby effectively clamping the rubber boot 42 tightly about the lower end of the post 28.

Figure 2:
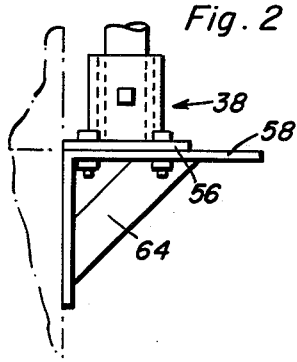
FIGURE 2 is an enlarged cross-sectional view taken substantially on a plane passing along line 2—2 in FIGURE 1.
Figure 3:
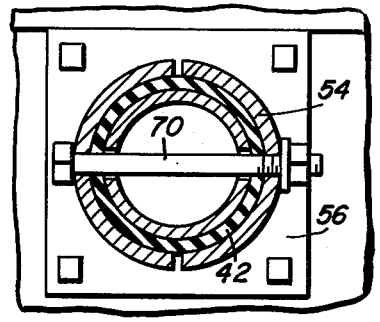
FIGURE 3 is an enlarged cross-sectional view taken substantially on a plane passing along line 3—3 in FIGURE 1.

The mounting socket 38 for the central post 30 on each side of the canopy 20 is similarly formed of two spaced semi-cylindrical sections 54, the lower edges of which are welded to a base which may be either a flat plate 56 bolted to the tractor fender 58, or the top flange 60 of a special mounting bracket 62 secured to the tractor frame forward of the fender. The use of a flat base 56 mounted directly on the tractor fender 58 is illustrated in FIGURES 1–3 with suitable braces 64 providing the additional support needed by the fender 58 to carry the superimposed load. The use of the special bracket 62 is illustrated in FIGURES 4 and 6–8. This bracket 62, in addition to the flat top flange 60, also includes an integrally formed depending mounting plate 66 welded directly to the tractor frame and an angular bracing rib 68 affixed to the both the upper flange 60 and the depending plate 66 so as to rigidify the entire bracket and provide a suitable support base for the post 30.

With reference to the cross-sectional views of FIGURES 7 and 8, it will be noted that the socket 38 is similarly provided with a resilient rubber boot 42 with the lower end of the post 30 being received therein and retained in position by the clamping force exerted by bolt means 70 extending therethrough. The bolt means 70, as is the case with the bolt means 52, extends through aligned apertures in the sections 54, the rubber boot 42 and the post 30. The apertures in both the sections 54 and the boot 42 are of a size so as to just receive the bolt 70 therethrough while the apertures through the lower portion of the post 30 consist of diametrically opposed vertically elongated slots 72 which are in addition of a width slightly greater than the bolt 70 thus allowing for the desired flexing of the post relative to the mounting socket. While not specifically illustrated, it will be appreciated that the lower ends of the posts 28 and 32 are similarly provided with elongated enlarged slots so as to enable a similar mounting of these members. It will of course be realized that the boot 42 will be tightly clamped about the lower end of the post 30 by a slight inward flexing of the two socket halves 54 by a tightening of the bolt means 70 thus effecting a firm gripping of the lower end of the post 30 while at the same time allowing for a dampening of the vibrations normally introduced into the canopy 20 during the operation of the tractor 22.

The rear supporting posts 32 are similarly resiliently mounted in the sockets 40 which are also provided with rubber boots 42. These rear sockets 40 are provided with a base 74 with the socket 40 and base 74 being welded within notches provided in the upper edge of a tractor shield 76 provided at the rear of the tractor behind the operator's seat. While the socket 40 has been illustrated as being of integral construction with the securing bolt means 78 extending therethrough, it will be appreciated that the socket 40 can, if deemed desirable, be formed in two sections similar to the sockets 36 and 38.

Figure 10:
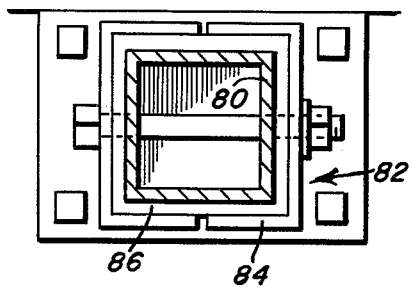
FIGURE 10 is a cross-sectional view similar to FIGURE 3, however illustrating a modified form of mounting means.

Attention is now specifically directed to FIGURE 10 which is a cross-sectional view similar to FIGURE 3 illustrating, however, a square supporting post 80 received within a socket 82 formed of two opposed channel shaped sections 84 with a rectangular rubber boot 86 being oriented between the post 80 and the socket 82 so as to provide the desired cushioning effect. As will be appreciated, the cross section of the structural members of the canopy 20 can be of any suitable cross section with the rubber boot and socket being modified accordingly.

From the foregoing, it is considered to be readily apparent that a novel mounting means for a tractor canopy has been defined. This mounting means basically comprises a socket for each supporting leg or post rigidly affixed to a tractor, a resilient cushioning boot positioned in the socket for the reception of the lower end of a post therein, and a bolt extending through the socket, rubber boot, and post end so as to retain the post within the socket. Additionally, it has been pointed out that each socket is preferably formed in two sections with the sections being spaced slightly from each other and being flexed towards each other so as to frictionally engage the boot with the post thus stabilizing the canopy while at the same time dampening undesirable noises and vibrations which would tend to structurally weaken the canopy. The cushioning boot, illustrated in FIGURE 9, is to be of a size so as to completely enclose the lower end of the post with the post itself having enlarged elongated slots so as to allow for passage of the bolt means therethrough and additionally so as to allow for a flexing of the mounted lower end of the post relative to the socket without introducing any undesirable stresses.

The foregoing is considered as illustrative only of the principles of the invention. Further, since the numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, a tractor canopy post and a vibration damping mount therefor, said mount comprising an upwardly opening socket including a bottom and a vertically extending peripheral side wall rigid with said bottom, an upwardly opening resilient cushioning boot received within said socket, said boot including a bottom generally conforming to and positioned against the socket bottom and a vertically extending side wall generally conforming to and positioned against the interior of the socket side wall, the lower end portion of the post being snugly received within said boot, said lower end portion being spaced from the bottom and side wall of said socket solely by said boot, and means locking said lower end portion of the post within the socket while allowing movement of the lower end portion relative to the socket, this movement being cushioned by said boot, said socket wall being formed in two vertical half sections, each section enclosing substantially one half of the boot received within the socket, said vertical sections facing each other with their edges spaced slightly from each other for allowing a flexing of the sections toward each other so as to effectively confine said boot and limit horizontal movement in all directions, said means consisting of an elongated bolt, said sections and said boot wall having aligned diametrically opposed bolt holes therethrough, said lower end portion of the post including a vertically elongated slot having its lower end terminating above the bottom of the post and its upper end below the top of the socket, said bolt extending through said holes and said slot, said slot allowing a limited vertical movement of the lower end portion of the post prior to engagement with the bolt, and means engaged with said bolt for effecting a drawing together of the upper portions of the sections so as to clamp the boot encompassed lower end portion of the post therein.

References Cited by the Examiner

UNITED STATES PATENTS

| 1,581,325 | 4/26 | Sands. | |
| 1,930,067 | 10/33 | Tibbetts | 248—10 |
| 2,030,550 | 2/36 | Smith | 287—111 |
| 2,118,550 | 5/38 | D'Aubarede | 180—64 |
| 2,300,226 | 10/42 | Ketchum | 287—111 X |
| 2,644,715 | 7/53 | Sammis | 296—43 |
| 2,734,708 | 2/56 | Cohn | 248—43 |
| 2,735,702 | 2/56 | Larson | 287—23 X |
| 2,805,887 | 9/57 | Selby | 296—102 |
| 3,036,858 | 5/62 | Fingerut | 296—102 |

OTHER REFERENCES

German Application F11573II/63c, Klasse, February 16, 1956.

A. HARRY LEVY, *Primary Examiner.*